United States Patent
Fujio et al.

(10) Patent No.: US 10,609,337 B2
(45) Date of Patent: Mar. 31, 2020

(54) IMAGE PROCESSING APPARATUS

(71) Applicant: FUJITSU TEN LIMITED, Kobe-shi, Hyogo (JP)

(72) Inventors: Akihide Fujio, Kobe (JP); Koichi Yamamoto, Kobe (JP); Azusa Minode, Kobe (JP); Yasushi Seike, Kobe (JP); Minoru Yoshimura, Kobe (JP)

(73) Assignee: DENSO TEN Limited, Kobe (JP)

( * ) Notice: Subject to any disclaimer, the term of this patent is extended or adjusted under 35 U.S.C. 154(b) by 360 days.

(21) Appl. No.: 14/836,345

(22) Filed: Aug. 26, 2015

(65) Prior Publication Data

US 2016/0088260 A1 Mar. 24, 2016

(30) Foreign Application Priority Data

Sep. 18, 2014 (JP) .................. 2014-189714

(51) Int. Cl.
*H04N 7/18* (2006.01)
*B60R 1/00* (2006.01)
*G06K 9/00* (2006.01)

(52) U.S. Cl.
CPC .............. *H04N 7/181* (2013.01); *B60R 1/00* (2013.01); *G06K 9/00812* (2013.01); *B60R 2300/105* (2013.01); *B60R 2300/607* (2013.01)

(58) Field of Classification Search
CPC .................. B60R 1/00; H04N 7/181
See application file for complete search history.

(56) References Cited

U.S. PATENT DOCUMENTS

| | | | | |
|---|---|---|---|---|
| 9,457,719 | B2 * | 10/2016 | Tanuki | E02F 9/261 |
| 2006/0132601 | A1 * | 6/2006 | Kukita | B60R 1/00 348/148 |
| 2010/0066833 | A1 * | 3/2010 | Ohshima | B60R 1/00 348/148 |
| 2013/0093851 | A1 * | 4/2013 | Yamamoto | G01S 15/931 348/46 |
| 2014/0293051 | A1 * | 10/2014 | Nakamura | E02F 9/261 348/148 |

FOREIGN PATENT DOCUMENTS

| | | |
|---|---|---|
| JP | 2008-034964 A | 2/2008 |
| JP | 2011-151489 A | 8/2011 |
| JP | 2014-129093 A | 7/2014 |
| WO | WO-2013168230 A1 * 11/2013 | ............... B60R 1/00 |

* cited by examiner

*Primary Examiner* — Rowina J Cattungal
(74) *Attorney, Agent, or Firm* — Oliff PLC

(57) ABSTRACT

An image processing apparatus includes an image processor configured to: acquire a plurality of captured images captured by a plurality of cameras installed on a vehicle; generate a composite image showing a vicinity of the vehicle viewed from a virtual viewpoint, using the plurality of captured images; generate a vicinity image by superimposing a distance indicator that shows at least one distance from the vehicle on the composite image, the distance indicator encompassing a periphery of the vehicle in the composite image; and output the vicinity image to a display to cause the vicinity image to be displayed on the display.

13 Claims, 12 Drawing Sheets

US 10,609,337 B2

IMAGE PROCESSING APPARATUS

BACKGROUND OF THE INVENTION

Field of the Invention

The invention relates to a technology for processing captured images captured by cameras installed on a vehicle.

Description of the Background Art

Conventionally, image display systems that generate images showing a periphery of a vehicle, such as a car, and that display the images on a display in the vehicle, are well known. By use of such an image display system, a user (typically a driver) can recognize situations of the periphery of the vehicle on a real-time-basis.

The user can recognize the situations in the periphery of the vehicle by the display of the images showing the periphery of the vehicle. However, when an object, such as an obstacle and a pedestrian, exists, there is a case where the user cannot understand an approximate distance to the object. In this case, it is difficult for the user to intuitively understand a degree of risk posed to the object.

SUMMARY OF THE INVENTION

According to one aspect of the invention, an image processing apparatus that processes an image includes an image processor configured to: acquire a plurality of captured images captured by a plurality of cameras installed on a vehicle; generate a composite image showing a vicinity of the vehicle viewed from a virtual viewpoint, using the plurality of captured images; generate a vicinity image by superimposing a distance indicator that shows at least one distance from the vehicle on the composite image, the distance indicator encompassing a periphery of the vehicle in the composite image; and output the vicinity image to a display to cause the vicinity image to be displayed on the display.

Since the vicinity image including the distance indicator that encompasses the periphery of the vehicle, showing the distance from the vehicle, is displayed, a user can intuitively understand a distance to an object in the vicinity of the vehicle.

According to another aspect of the invention, the image processor acquires information relating to a traveling state of the vehicle.

According to another aspect of the invention, the image processor generates the vicinity image based on the traveling state of the vehicle.

Accordingly, an appropriate distance indicator can be used, depending on the traveling state. Thus, the user can easily understand the distance to the object in the periphery of the vehicle in various traveling states.

Therefore, an object of the invention is to enable a user to intuitively understand a distance to an object in a periphery of a vehicle.

These and other objects, features, aspects and advantages of the invention will become more apparent from the following detailed description of the invention when taken in conjunction with the accompanying drawings.

DESCRIPTION OF THE EMBODIMENTS

Embodiments of the invention are described below with reference to the drawings.

1. First Embodiment

<1-1. System Configuration>

Figure 1:
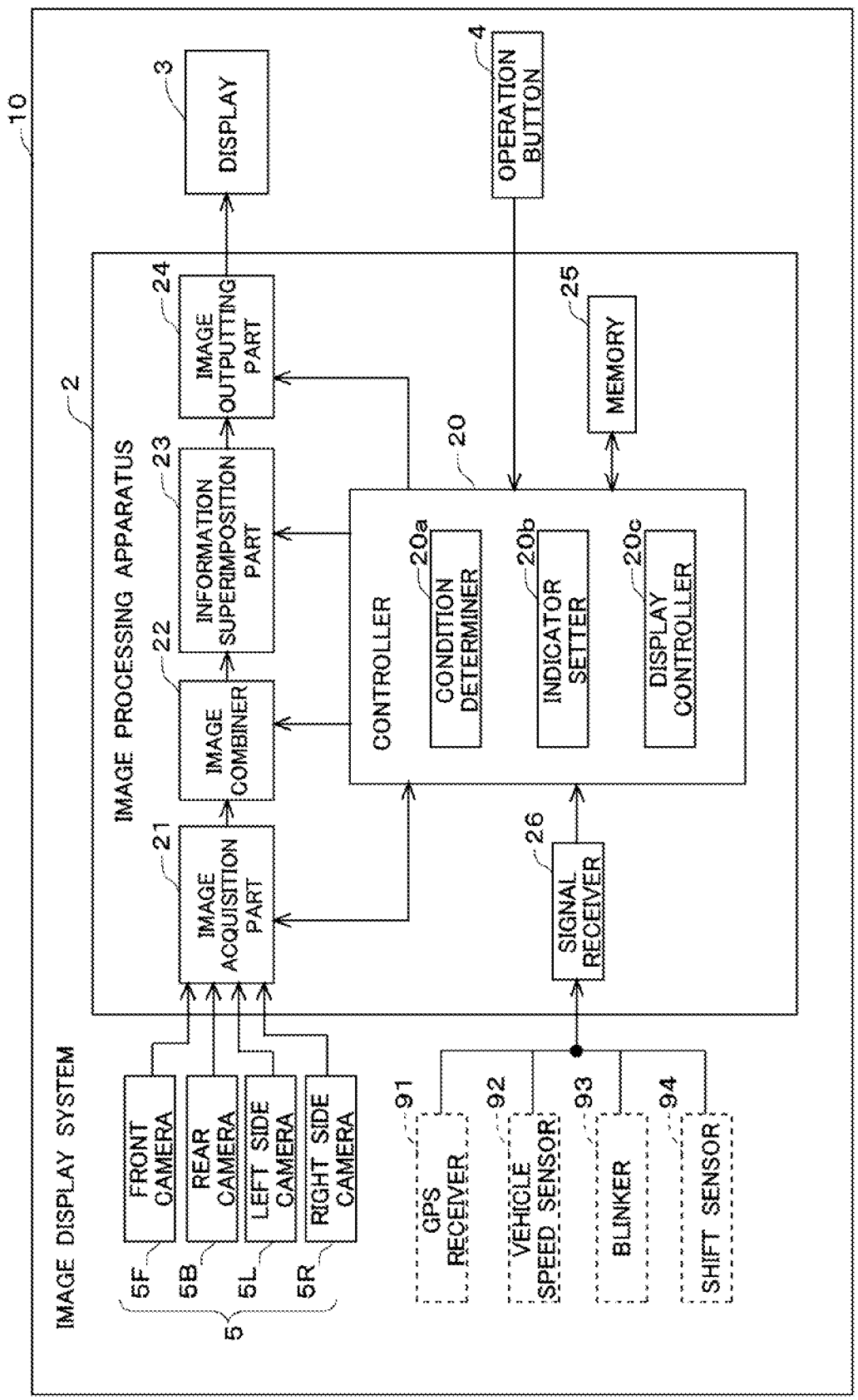
FIG. 1 illustrates an outline of an image display system.

FIG. 1 is a block diagram of an image display system 10 of a first embodiment. The image display system 10 is used in a vehicle (a car in this embodiment). The image display system 10 includes a function of generating images showing an area of a vicinity of the vehicle and then displaying the generated images in the vehicle. A user (typically a driver) of the image display system 10 can understand situations of the vicinity of the vehicle substantially on a real-time-basis, using the image display system 10, and thus can intuitively understand distances of objects in the vicinity of the vehicle. The vehicle on which the image display system 10 is installed is referred to as "host vehicle."

As shown in FIG. 1, the image display system 10 mainly includes a plurality of cameras 5, an image processing apparatus 2, a display 3 and an operation button 4. Each of the plurality of cameras 5 acquires captured images by capturing images showing the vicinity of the host vehicle, and inputs the captured image to the image processing apparatus 2. Using the captured images showing the vicinity of the host vehicle, the image processing apparatus 2 generates a vicinity image to be displayed on the display 3. The display 3 displays the vicinity image generated by the image processing apparatus 2. Moreover, the operation button 4 receives operations of the user.

Each of the plurality of cameras 5 includes a lens and an image sensor, and electronically captures the captured images showing the vicinity of the host vehicle. The plurality of cameras 5 includes a front camera 5F, a rear camera 5B, a left side camera 5L and a right side camera 5R. Those four cameras 5F, 5B, 5L and 5R are provided to positions of a host vehicle 9 that are different from one another and capture images in different directions, showing the vicinity of the host vehicle 9.

Figure 2:
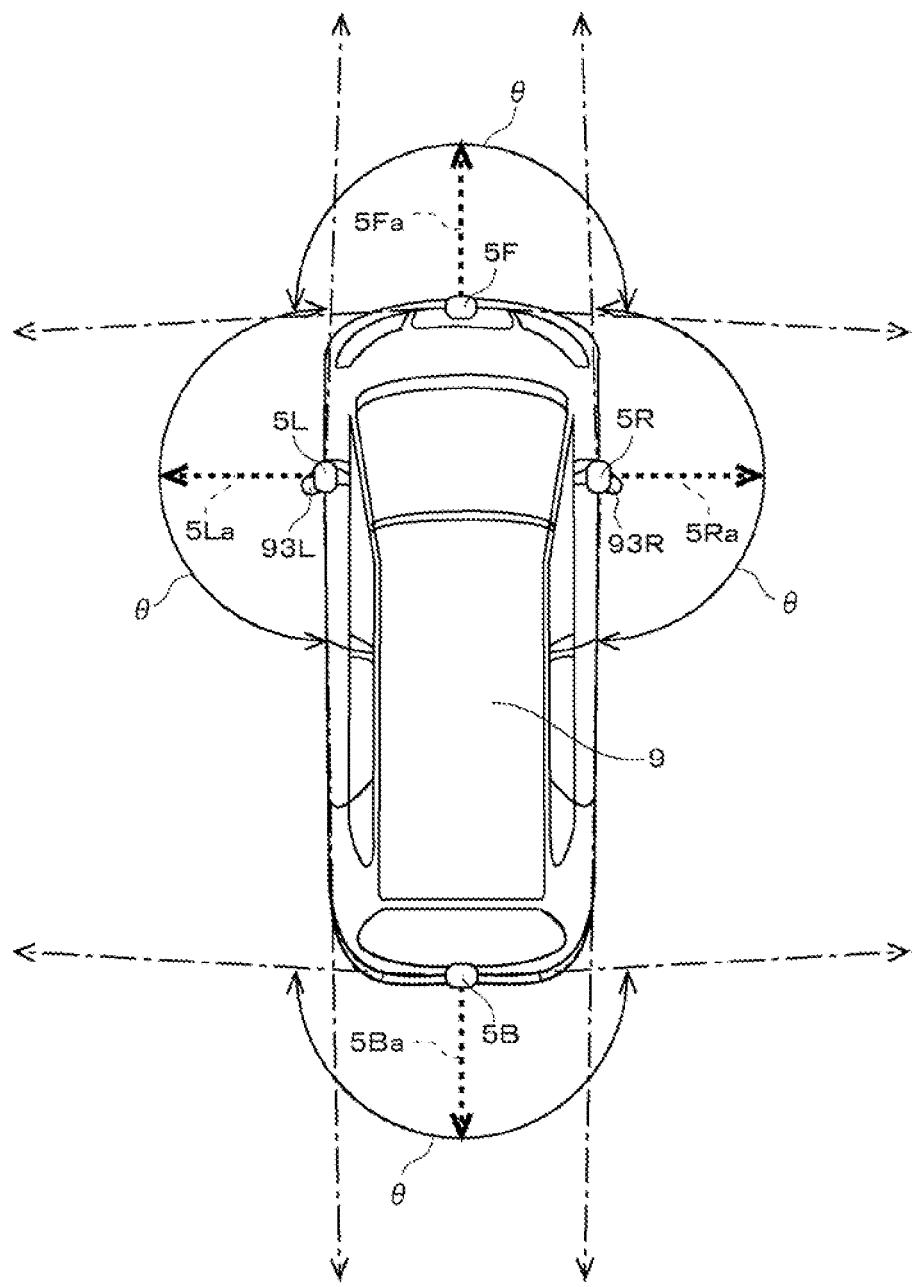
FIG. 2 illustrates directions in which four cameras capture images.

FIG. 2 illustrates the directions in which the four cameras 5F, 5B, 5L and 5R capture images. The front camera 5F is provided on a front end of the host vehicle 9, having an optical axis 5Fa in a traveling direction of the host vehicle 9. The rear camera 5B is provided on a rear end of the host vehicle 9, having an optical axis 5Ba in a direction opposite to the traveling direction of the host vehicle 9. The left side camera 5L is provided on a left side mirror 93L on a left side of the host vehicle 9, having an optical axis 5La in a left direction (orthogonal direction to the traveling direction) of the host vehicle 9. Moreover, the right side camera 5R is provided on a right side mirror 93R on a right side of the host vehicle 9, having an optical axis 5Ra in a right direction (orthogonal direction to the traveling direction) of the host vehicle 9.

A wide lens, such as a fish lens, is used for each of those cameras 5F, 5B, 5L and 5R, and, each of the cameras 5F, 5B, 5L and 5R has a view angle θ of 180 degrees or more. Therefore, by using the four cameras 5F, 5B, 5L and 5R, it is possible to capture the images of an entire periphery of the host vehicle 9.

With reference back to FIG. 1, the display 3 includes, for example, a thin liquid crystal display panel and displays various information and images. The display 3 may be disposed to an instrument panel and the like of the host vehicle 9 such that the user can see a screen of the display 3. The display 3 may be disposed in a housing with the image processing apparatus 2 as one unit or may be separated from the image processing apparatus 2 as a different apparatus.

The operation button 4 is an operation member that receives the operations of the user. The operation button 4 is provided, for example, to a steering wheel of the host vehicle 9 and receives the operations mainly from the driver. Moreover, a touch panel provided to the display 3 may be used as an operation member. The user can operate the image display system 10 with the operation button 4 and the touch panel of the display 3. In a case where the user makes an operation with the operation button 4, an operation signal indicating a content of the operation is input to the image processing apparatus 2.

The image processing apparatus 2 is an electronic device that performs various image processing. The image processing apparatus 2 includes an image acquisition part 21, an image combiner 22, an information superimposition part 23 and an image outputting part 24.

The image acquisition part 21 acquires the captured images captured by the four cameras 5F, 5B, 5L and 5R. The image acquisition part 21 includes image processing functions, such as a function of converting analog captured images to digital captured images. The image acquisition part 21 performs a predetermined process of the acquired captured images and then outputs, to the image combiner 22, the captured images after the process.

The image combiner 22 is a hardware circuit that performs image processing to generate a composite image. The image combiner 22 generates the composite image showing the vicinity of the host vehicle 9 viewed from a virtual viewpoint by combining plural captured images captured by the plurality of cameras 5. The image combiner 22 projects data of the plural captured images onto a virtual projection plane corresponding to the vicinity of the host vehicle 9 and then generates the composite image, using the data on the projection plane. A method of generating the composite image will be described later.

The information superimposition part 23 superimposes various information that is necessary for the driver, on the composite image generated by the image combiner 22. The information superimposition part 23 generates the vicinity image by superimposing, on the composite image, an indicator showing a distance from the host vehicle 9 (hereinafter referred to as "distance indicator"). In this embodiment, the vicinity image is generated by superimposing the distance indicator encompassing the periphery of the host vehicle 9, on the composite image. In the vicinity image, the distance indicator is a rough idea of the distance from the host vehicle 9. A method of generating the vicinity image will be also described later in detail.

The image outputting part 24 outputs, to the display 3, the vicinity image generated by the information superimposition part 23 and causes the vicinity image to be displayed on the display 3. Thus, an image showing the vicinity of the host vehicle 9 viewed from a virtual viewpoint is displayed on the display 3.

Moreover, the image processing apparatus 2 further includes a controller 20, a memory 25 and a signal receiver 26. The controller 20 is a microcomputer including, for example, a CPU, a RAM, a ROM, etc. and comprehensively controls the entire image processing apparatus 2.

The memory 25 is a non-volatile memory, such as a flash memory, and stores various information. The memory 25 stores programs as firmware, map data, data that is used by the image combiner 22 to generate the composite image and data that is used by the information superimposition part 23 to generate the vicinity image. For example, the data that is used to generate the vicinity image includes data such as the distance indicator indicating the distance from the host vehicle 9.

The signal receiver 26 receives signals from apparatuses, devices, etc. in the host vehicle 9 that are other than the image processing apparatus 2, and outputs the received signals to the controller 20. Some among the other apparatuses are a GPS (global positioning system) receiver 91, a vehicle speed sensor 92, a blinker 93 and a shift sensor 94.

The signal receiver 26 receives, from the GPS receiver 91, signals indicating location information of the host vehicle 9 derived based on signals received from GPS satellites. Moreover, the signal receiver 26 receives, from the vehicle speed sensor 92, signals indicating a vehicle speed (km/h) that is an absolute traveling speed of the host vehicle 9. The signal receiver 26 receives, from the blinker 93, signals indicating a direction into which the driver intends to change a traveling direction. The signal receiver 26 receives, from the shift sensor 94, signals indicating a shift position that is a position of a shift lever of the host vehicle 9.

Various functions of the controller 20 are implemented by the CPU performing arithmetic processing based on programs stored in the memory 25. A condition determiner 20a, an indicator setter 20b and a display controller 20c shown in FIG. 1 are a part of the functions implemented by the CPU performing arithmetic processing based on the programs.

The condition determiner 20a determines whether or not a condition for generation and display of the vicinity image is satisfied. The indicator setter 20b sets a mode and the like of the distance indicator that is superimposed on the vicinity image. Moreover, the display controller 20c controls the image outputting part 24 to output, to the display 3, the vicinity image to be displayed. Detailed processes of the functions 20a to 20c that are implemented by the controller 20 will be described later.

<1-2. Generation of Composite Image>

Figure 3:
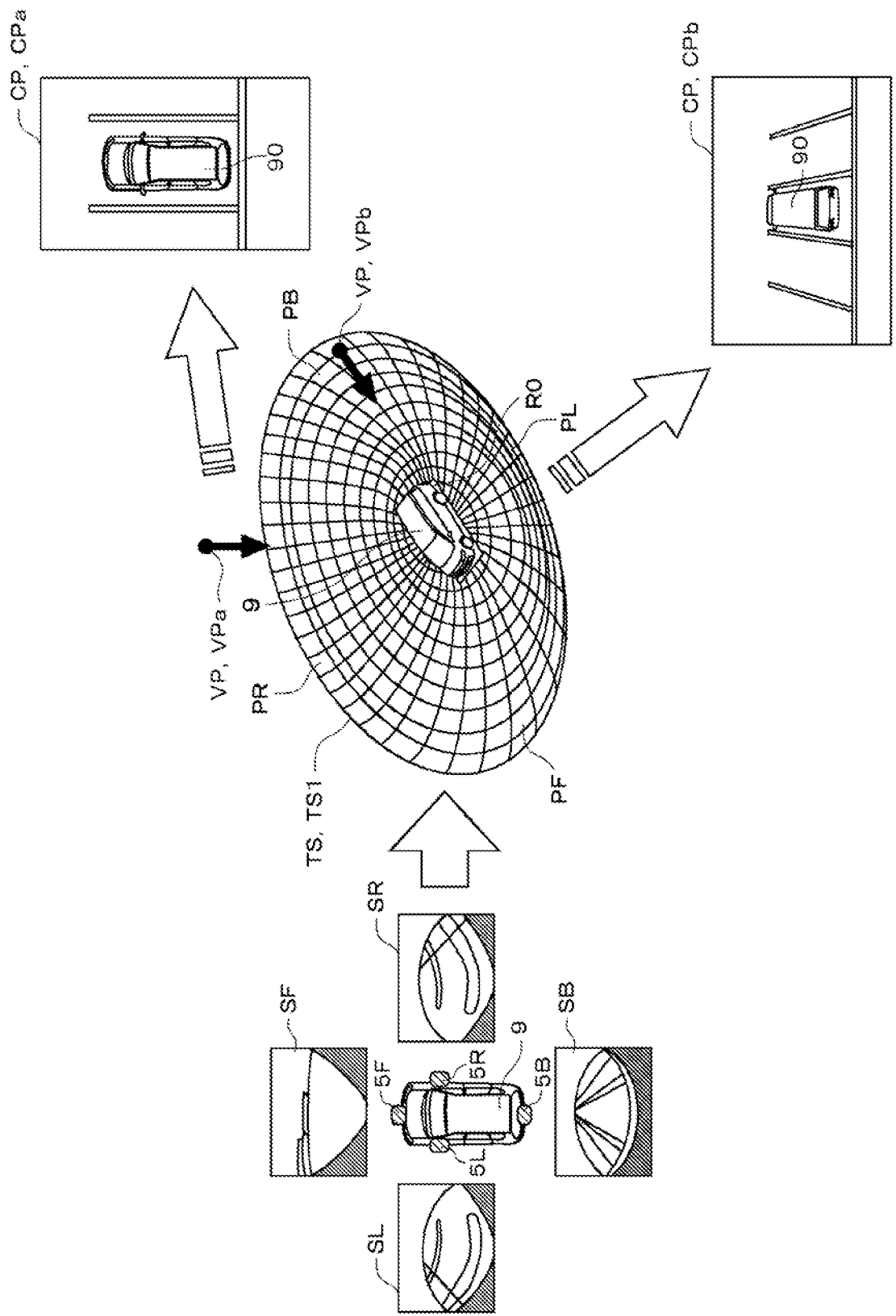
FIG. 3 illustrates a method of generating a composite image.

Next described is a method that is used by the image combiner 22 to generate the composite image showing the vicinity of the host vehicle 9 viewed from a virtual viewpoint. FIG. 3 illustrates the method that is used by the image combiner 22 to generate the composite image.

When the front camera 5F, the rear camera 5B, the left side camera 5L and the right side camera 5R capture images, four captured images SF, SB, SL and SR showing areas in front, behind, of the left side and of the right side of the host vehicle 9, respectively, are acquired. Data of the entire periphery of the host vehicle 9 is included in the four captured images SF, SB, SL and SR.

The image combiner 22 first projects data (values of individual pixels) included in the four captured images SF, SB, SL and SR, onto a projection plane TS in a virtual 3D space. The projection plane TS is a virtual 3D plane corresponding to the area of the vicinity of the host vehicle 9. A center area of the projection plane TS is defined as a vehicle region R0 in which an image of the host vehicle 9 is placed.

The data of the captured image is not projected onto the vehicle region (region for the image of the host vehicle 9) R0 of the projection plane TS and is projected onto a region outside the vehicle region R0. The region of the projection plane TS onto which the data of the captured image is projected (region outside the vehicle region R0) is hereinafter referred to as "projection region."

Moreover, the vehicle region R0 virtually includes a vehicle image PG that is a polygon model showing a 3D shape of the host vehicle 9. The rendered vehicle image PG is placed in the center area defined as a position of the host vehicle 9, of a substantially hemisphere in the 3D space in which the projection plane TS is provided.

Each area of the projection region of the projection plane TS is associated with one of the four captured images SF, SB, SL and SR based on corresponding information such as a table data and the like. The image combiner 22 projects the data of each of the four captured images SF, SB, SL and SR, onto each corresponding area of the projection region.

The image combiner 22 projects the data of the captured image SF captured by the front camera 5F onto an area PF of the projection region corresponding to the area in front of the host vehicle 9. Moreover, the image combiner 22 projects the data of the captured image SB captured by the rear camera 5B onto an area PB of the projected region corresponding to the area behind the host vehicle 9. Moreover, the image combiner 22 projects the data of the captured image SL captured by the left side camera 5L onto an area PL of the projection region corresponding to the area of the left side of the host vehicle 9 and project the data of the captured image SR captured by the right side camera 5R onto an area PR of the projection region corresponding to the area of the right side of the host vehicle 9.

Once projecting the data of the captured images to the areas of the projection region of the projection plane TS, the image combiner 22 virtually configures the virtual 3D polygon model showing the 3D shape of the host vehicle 9. The model of the host vehicle 9 is placed in the vehicle region R0 defined as the area of the host vehicle 9 in the 3D space in which the projection plane TS is set.

Next, the controller 20 controls the image combiner 22 to set a virtual viewpoint VP to the 3D space. The image combiner 22 sets the virtual viewpoint VP having an arbitrary line of sight at an arbitrary location in the 3D space. Then, the image combiner 22 clips, as an image, from the projection plane TS, projected data of a region viewed at a predetermined view angle from the set virtual viewpoint VP. Moreover, the image combiner 22 renders the model of the host vehicle 9 according to the set virtual viewpoint VP and superimposes a 2D vehicle image 90 created through the rendering on the clipped image. Thus, the image combiner 22 generates a composite image CP showing the host vehicle 9 and the area of the vicinity of the host vehicle 9 viewed from the virtual viewpoint VP. The vehicle image 90 shows the host vehicle 9 in the composite image CP.

For example, as shown in FIG. 3, in a case where a virtual viewpoint VPa is set immediately above the host vehicle 9, having a line of sight looking straight down, a composite image (overhead image) CPa looking down the host vehicle 9 and the area of the vicinity of the host vehicle 9 is generated. Moreover, in a case where a viewpoint VPb is set behind and above the host vehicle 9, having a line of sight looking down obliquely forward, a composite image CPb showing the area of the vicinity of the host vehicle 9 viewed from the point above and behind the host vehicle 9 is generated.

<1-3. Generation and Display of Vicinity Image>

Figure 4:
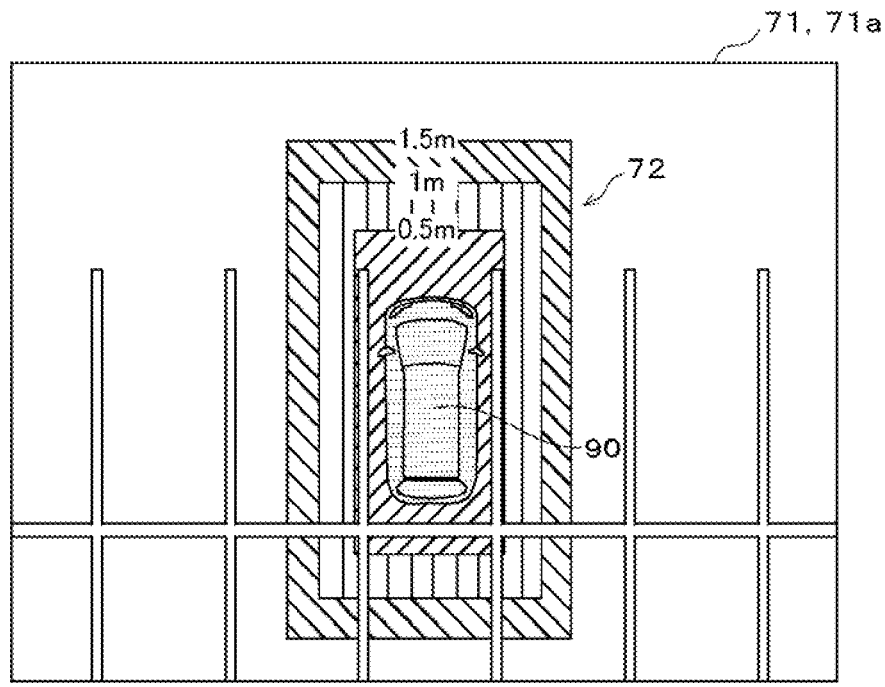
FIG. 4 illustrates an example of a vicinity image.
Figure 5:
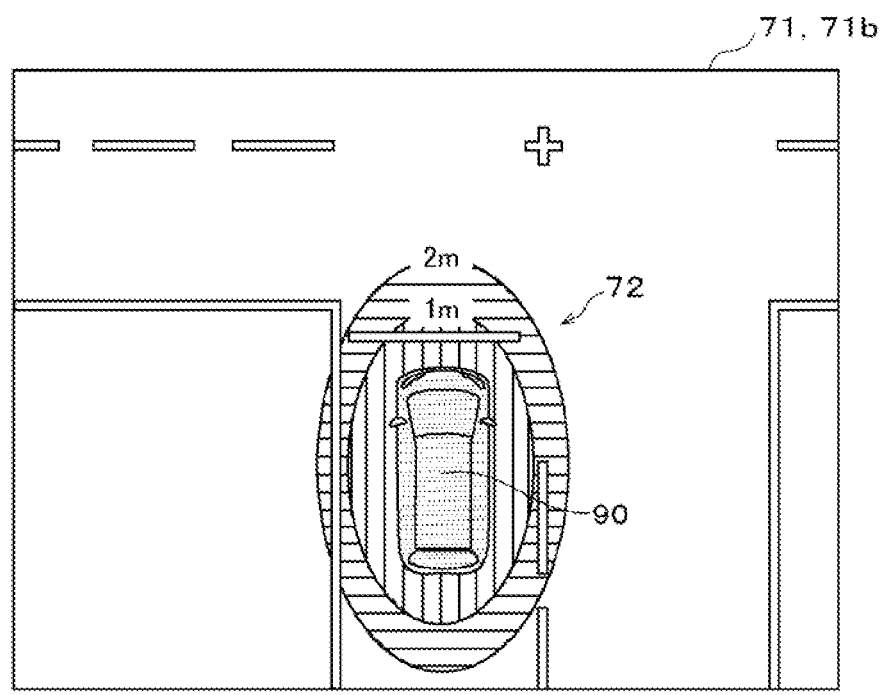
FIG. 5 illustrates an example of a vicinity image.
Figure 6:
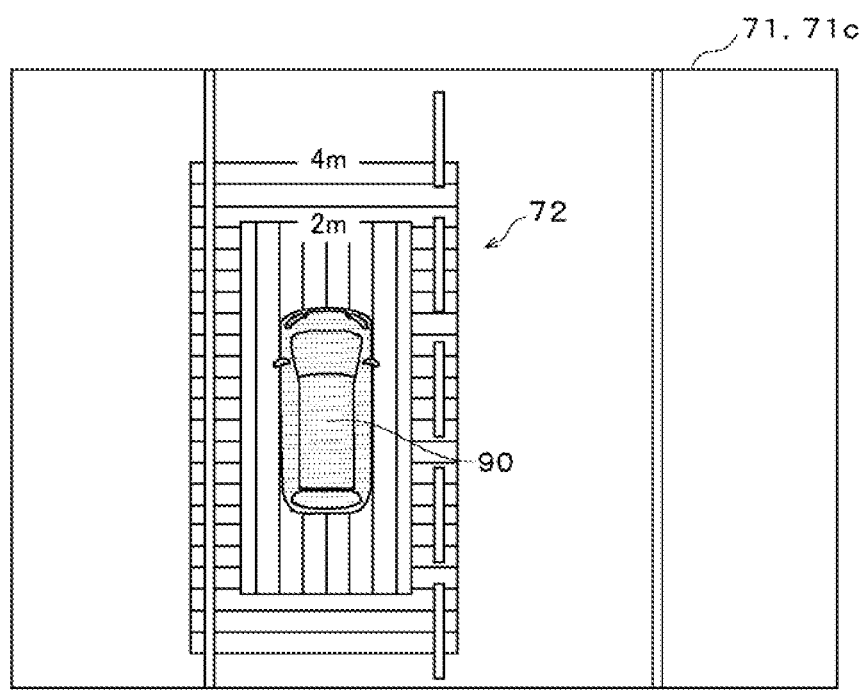
FIG. 6 illustrates an example of a vicinity image.

Next described is a process performed by the image display system 10 to generate and display the vicinity image. FIGS. 4 to 6 illustrate examples of a vicinity image 71 to be generated and displayed. The image display system 10 in this embodiment generates the vicinity images 71, using a distance indicator 72 of which a mode is changed according to a location and a traveling state of the host vehicle 9, and the image display system 10 displays one of three types (a first vicinity image 71a, a second vicinity image 71b and a third vicinity image 71c shown in FIGS. 4 to 6) of the vicinity image 71, according to the location and the traveling state of the host vehicle 9.

As shown in FIGS. 4 to 6, the vicinity image 71 is an overhead composite image viewed downward from a virtual viewpoint above the host vehicle 9 and is generated by superimposing the distance indicator 72 encompassing the periphery of the vehicle image 90 showing the host vehicle 9. In other words, the vicinity image 71 is an image including the distance indicator 72 encompassing the periphery of the host vehicle 9.

The distance indicator 72 includes a plurality of distance lines defining a predetermined distance from the host vehicle 9. Each of such distance lines shows distance from the host vehicle 9. As the distance indicator 72, distances (figures) respectively corresponding to the plurality of distance lines may also be displayed or regions defined by the plurality of distance lines may be displayed in different colors or in different patterns. Thus, the driver intuitively can understand distances from the host vehicle 9 only by seeing the vicinity image 71 displayed on the display 3.

Here, a process of generating the vicinity image 71 is described. Once the image acquisition part 21 obtains the captured images, the indicator setter 20b acquires vehicle information (e.g. location information, vehicle speed information and shift position information) relating to the traveling state of the host vehicle 9 and selects the distance indicator 72 that is superimposed on the composite image based on the vehicle information.

The memory 25 stores a first distance indicator, a second distance indicator and a third distance indicator as image data of the distance indicator 72 that are used for the first vicinity image 71a, the second vicinity image 71b and the third vicinity image 71c. As for the first to third distance indicators, a mode such as intervals between the plurality of distance lines and a shape of the plurality of distance lines is different from one another.

Concretely, the first distance indicator is image data of substantially rectangle-shaped distance indicator including two or three distance lines at intervals of 0.5 m. The second distance indicator is image data of substantially ellipse-shaped distance indicator including two or three distance lines at intervals of 1.0 m. The third distance indicator is image data of substantially rectangle-shaped distance indicator including two or three distance lines at intervals of 2.0 m. In other words, the intervals between the distance lines of the first distance indicator are smallest intervals and the intervals between the distance lines of the third distance indicator are greatest intervals.

Moreover, the first distance indicator and the third distance indicator are substantially rectangle-shaped. Therefore, distances from the host vehicle 9 to the distance lines are same in front, back, left side and right side directions. For example, as for the first distance indicator, distances of 0.5 m and 1.0 m from the host vehicle 9 to the distance lines are same in the front, back, left side and right side directions On the other hand, the second distance indicator is substantially ellipse-shaped. Therefore, a shape of the second distance indicator is different from shapes of the first and third distance indicators. In other words, in the second distance indicator, a distance from the host vehicle 9 to one of the distance lines is 1.0 m in the front and back directions. However, a distance from the host vehicle 9 to the distance line is (1.0+α) m in the left side and right side directions. As described later, since the second distance indicator is used when the host vehicle 9 turns left or right, the shape of the second distance indicator is set in consideration of a difference between inner and outer rings of the host vehicle 9. In consideration of the difference of the modes of the distance indicators, the indicator setter 20*b* selects an appropriate distance indicator from amongst the first to third distance indicators based on the vehicle information and determines the selected distance indicator as the distance indicator 72 that is used to generate the vicinity image 71.

As described above, the image display system 10 in this embodiment changes the different vicinity image 71, depending on the location and the traveling state of the host vehicle 9. In other words, the indicator setter 20*b* selects the distance indicator 72 in a different mode, depending on the location and the traveling state of the host vehicle 9. For example, in a case where the host vehicle 9 is in a parking lot, the image display system 10 displays the first vicinity image 71*a*. In other words, the indicator setter 20*b* selects the first distance indicator of which the intervals between the distance lines are the smallest because in a case where the host vehicle 9 travels in a parking lot, attention needs to be paid especially to an obstacle existing near the host vehicle 9.

Then, the information superimposition part 23 generates the first vicinity image 71*a* by superimposing the first distance indicator selected by the indicator setter 20*b* on the composite image generated by the image combiner 22. In other words, the information superimposition part 23 generates the first vicinity image 71*a* such that a location of the host vehicle 9 in the image data of the first distance indicator is matched with a location of the host vehicle 9 in the composite image.

Moreover, in a case where the host vehicle 9 is turning right or left at an intersection and the like, the image display system 10 displays the second vicinity image 71*b*. In other words, the indicator setter 20*b* selects the second distance indicator that includes the ellipse-shaped distance lines. When the host vehicle 9 turns right or left, there are risks that the host vehicle 9 hits a pedestrian or a motor cycle near the host vehicle 9 and that the host vehicle 9 drives over an obstacle near the host vehicle 9. Therefore, the second distance indicator set in consideration of a difference between inner and outer rings is selected in order to understand the risks. The information superimposition part 23 generates the second vicinity image 71*b* by superimposing the second distance indicator selected by the indicator setter 20*b* on the composite image generated by the image combiner 22, as described above.

Further, in a case where the image display system 10 displays neither the first vicinity image 71*a* nor the second vicinity image 71*b*, the image display system 10 displays the third vicinity image 71*c*. In other words, the indicator setter 20*b* selects the third distance indicator of which the intervals between the distance lines are the greatest. Then, the information superimposition part 23 generates the third vicinity image 71*c* by superimposing the third distance indicator selected by the indicator setter 20*b* on the composite image generated by the image combiner 22, as described above.

Accordingly, the vicinity images 71 as shown in FIGS. 4 to 6 are generated. The display controller 20*c* controls the image outputting part 24 to output the generated vicinity images to the display 3, and the display 3 displays the vicinity images 71.

When the vicinity image 71 is generated, it is recommended that the distance indicator 72 should be under a background image because white lines, an obstacle, etc. actually existing in a background but hidden and unable to be seen under the distance indicator 72 may pose a risk.

<1-4. System Process>

Figure 7:
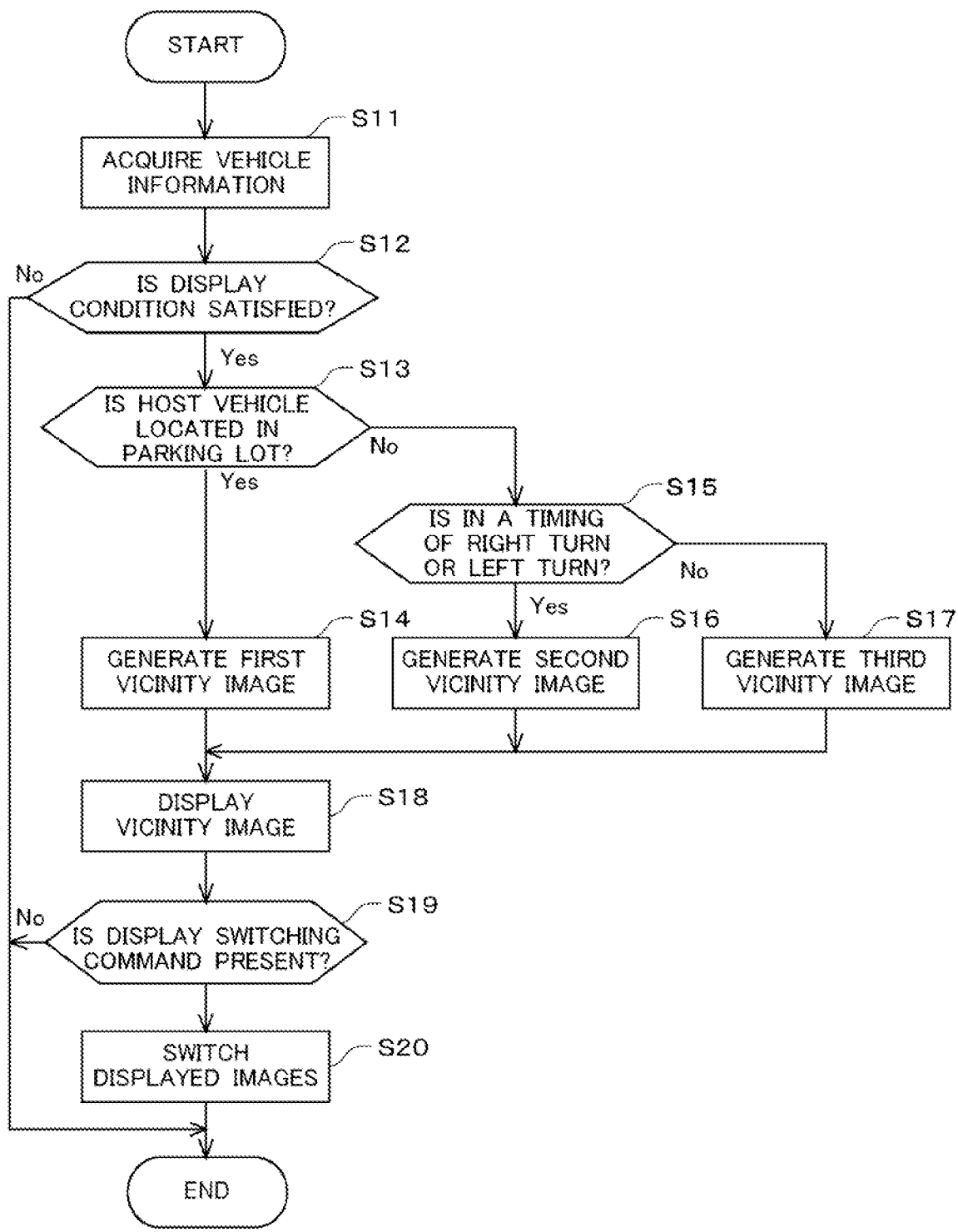
FIG. 7 is a flowchart showing a process performed by an image display system in a first embodiment.

Next, a process performed by the image display system 10 is explained. FIG. 7 is a flowchart showing a flow of the process performed by the image display system 10.

The process performed by the image display system 10 is started, for example, by start-up of the image display system 10. When the process is started, the image display system 10 acquires the vehicle information indicating the traveling state of the host vehicle 9 (a step S11). The vehicle information includes location information, vehicle speed information and shift position information. In other words, the signal receiver 26 acquires the location information of the host vehicle 9 from the GPS receiver 91 and then inputs the location information into the controller 20. Moreover, the signal receiver 26 acquires the vehicle speed information of the host vehicle 9 from the vehicle speed sensor 92 and then inputs the vehicle speed information into the controller 20. Further, the signal receiver 26 acquires the shift position information of the host vehicle 9 from the shift sensor 94 and then inputs the shift position information into the controller 20.

Next, the image display system 10 determines whether or not a display condition for display of the vicinity image 71 is satisfied (i.e. whether or not to display the vicinity image 71) (a step S12). This step is equivalent to a process of determining whether or not the acquired vehicle information indicating the traveling state of the host vehicle 9 satisfies a predetermined condition. In a case where at least one of conditions (a1) to (a3) listed below is satisfied, the condition determiner 20*a* determines that the display condition is satisfied.

(a1) The host vehicle 9 is located in a parking lot or a narrow street.

(a2) A speed of the host vehicle 9 is 20 km/h or less.

a3) The shift lever of the host vehicle 9 is located in reverse (R).

The conditions (a1) to (a3) are for determining whether or not the host vehicle 9 is in a suitable situation to display the vicinity image 71. In a case where the host vehicle 9 is traveling fast, there is a high possibility that the user (driver) is not in a state in which the user can check risks in the vicinity of the host vehicle 9 based on the vicinity image 71. On the other hand, in a case where the host vehicle 9 is traveling slowly, there is a high possibility that the host vehicle 9 is traveling an area in which obstacles and the like exist in the periphery of the host vehicle 9. Therefore, in this embodiment, a situation in which the host vehicle 9 is traveling slowly or a situation in which the host vehicle 9 will probably travel slowly is deemed as the suitable situation to display the vicinity image 71.

Concretely, the condition (a1) is used to determine whether or not the host vehicle 9 is located in an area generally deemed as an area in which vehicles travel slowly. Therefore, areas that satisfy the condition (a1) are not limited to a parking lot and a narrow street, but other areas in which vehicles probably travel slowly may also be included in the condition (a1). The condition determiner 20a determines whether or not the condition (a1) is satisfied, based on the location information acquired from the signal receiver 26 and map data stored in the memory 25.

Moreover, the condition (a2) is used to determine whether or not the host vehicle 9 is traveling slowly. In other words, the condition (a2) is used to determine whether or not the host vehicle 9 is traveling at a speed that is suitable to display the vicinity image 71. The suitable speed to display the vicinity image 71 may be set arbitrarily. In other words, the speed that satisfies the condition (a2) is not limited to 20 km/h or less, but the speed may be set, for example, at 15 km/h or less or 10 km/h or less.

Moreover, the condition (a3) is also used to determine whether or not the host vehicle 9 is traveling slowly. In other words, the shift lever of the host vehicle 9 positioned in reverse means that the host vehicle 9 travels backward. Therefore, there is a high possibility that the host vehicle 9 travels slowly. Moreover, there is a high possibility that the host vehicle 9 is located in a situation in which it is suitable to display the vicinity image 71, such as in a parking lot.

In this determination process, in a case where none of the display conditions is satisfied (No in the step S12), the image display system 10 ends the process. On the other hand, in a case where the display condition is satisfied (Yes in the step S12), the indicator setter 20h next determines whether or not the host vehicle 9 is located in a parking lot or in a narrow street (a step S13). This process is to determine whether or not to select the first vicinity image 71a as the vicinity image 71 to be displayed. In other words, this process is to determine whether or not to select the first distance indicator as the distance indicator 72. Whether or not the host vehicle 9 is located in a parking lot or in a narrow street can be determined based on a determination result determined based on the condition (a1).

In a case where the host vehicle 9 is located in a parking lot or in a narrow street (Yes in the step S13), the indicator setter 20b selects the first distance indicator and the information superimposition part 23 generates the first vicinity image 71a by the method described above (a step S14).

On the other hand, in a case where the host vehicle 9 is not located in a parking lot or in a narrow street (No in the step S13), the indicator setter 20b determines whether or not the host vehicle 9 is in a timing of a right turn or a left turn (a step S15). This process is to determine to select the second vicinity image 71b or the third vicinity image 71c as the vicinity image 71 to be displayed. In other words, this process is to determine the second distance indicator or the third distance indicator as the distance indicator 72 to be selected.

A case where the host vehicle 9 is in the timing of a right turn or a left turn means a case where the host vehicle 9 is traveling before an intersection or in an intersection. It is possible to determine whether or not the host vehicle 9 is in the timing of a right turn or a left turn, based on presence or absence of a signal for traveling course change, received from the blinker, and on a traveling direction indicated by the signal.

In a case where the host vehicle 9 is in the timing of a right turn or a left turn (Yes in the step S15), the indicator setter 20b selects the second distance indicator and the information superimposition part 23 generates the second vicinity image 71b by the method described above (a step S16). On the other hand, in a case where the host vehicle 9 is not in the timing of a right turn or a left turn (No in the step S15), the indicator setter 20b selects the third distance indicator and the information superimposition part 23 generates the third vicinity image 71c by the method described above (a step S17).

Once the information superimposition part 23 generates one of the first vicinity image 71a, the second vicinity image 71b and the third vicinity image 71c, the display 3 displays the vicinity image 71 (a step S18). In other words, the display controller 20c controls the image outputting part 24 to output the vicinity image 71 generated by the information superimposition part 23, to the display 3. Then, the display 3 displays the vicinity image 71 input from the image outputting part 24.

Next, presence or absence of a display switching command is determined (a step S19). Display switching refers to changing the vicinity image 71 to a different vicinity image 71 generated by use of a composite image viewed from a different virtual viewpoint. For example, in case where the display 3 is displaying the vicinity image 71 generated by use of a composite image viewed from a virtual viewpoint above the host vehicle 9 like the vicinity image 71 in FIG. 4, the displayed vicinity image 71 is switched to a different vicinity image 71 generated by use of a composite image viewed from a virtual viewpoint behind and above the host vehicle 9 like the vicinity image 71 in FIG. 8. The virtual viewpoint to be changed is not limited to the viewpoint above the host vehicle 9 and the viewpoint behind and above the host vehicle 9, but may be arbitrarily located. Moreover, presence or absence of the display switching command can be determined based on a signal indicating a command of the display switching that is input by an operation made by the user with the operation button 4 and the like.

In a case of absence of the display switching command (No in the step S19), the process ends without switching the vicinity image 71. On the other hand, in a case of presence of the display switching command (Yes in the step S19), the displayed vicinity image 71 is switched to a newly generated vicinity image 71 (a step S20).

Figure 8:
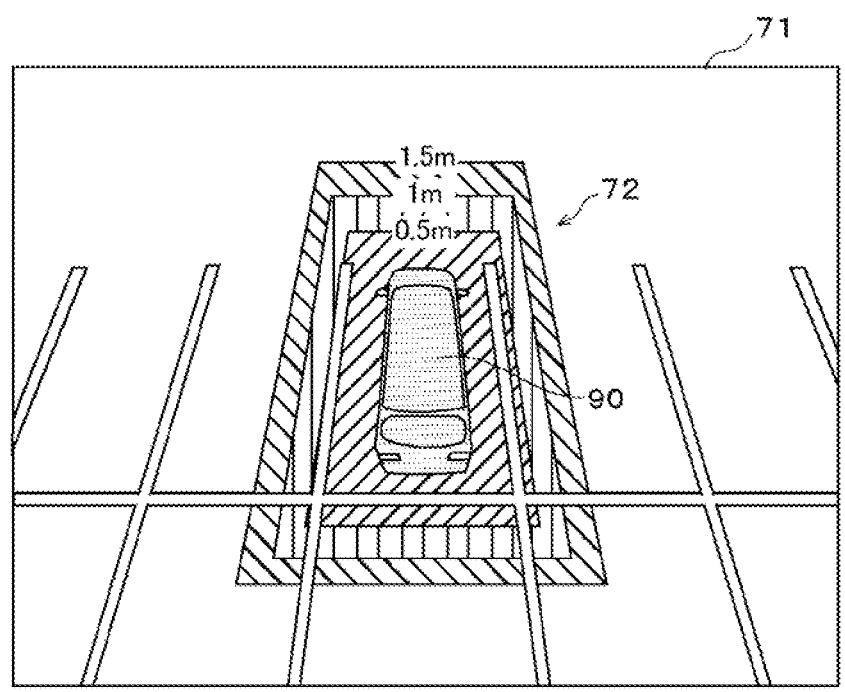
FIG. 8 illustrates an example of a vicinity image.

In other words, the image combiner 22 generates a composite image viewed from a virtual viewpoint specified by the user. Then, once the information superimposition part 23 generates a new vicinity image 71 by superimposing the distance indicator 72 on the generated composite image, the display controller 20c controls the image outputting part 24 to output the new vicinity image 71 to the display 3. Then, the display 3 displays the vicinity image 71 input from the image outputting part 24. For example, when the vicinity image 71 in FIG. 4 is displayed, if there is input of a command for switching the vicinity image 71 to a vicinity image 71 viewed from a viewpoint behind and above the host vehicle 9, the vicinity image 71 in FIG. 8 is newly generated and displayed.

As described above, the image display system 10 in this embodiment displays the vicinity image including the distance indicator 72 encompassing the vicinity of the host vehicle 9. Therefore, the user can intuitively understand a distance to objects existing in the vicinity of the host vehicle 9. As a result, the user can intuitively understand degrees of risks relating to the host vehicle 9.

2. Second Embodiment

Next, a second embodiment is described. The first embodiment describes the configuration in which in the case where one of the display conditions (a1) to (a3) is satisfied, the display condition is deemed to be satisfied and the vicinity image 71 is displayed. However, the invention is not limited to the configuration. As an example of other configurations, in addition to the satisfaction of one of the display conditions, presence of an object, such as an obstacle, in a vicinity of a host vehicle 9 may be one of the display conditions for displaying a vicinity image 71. Therefore, the configuration is described in the second embodiment. In the explanation described below, difference from the configuration in the first embodiment is mainly described and there is a case where explanation of similar points is omitted.

<2-1. System Configuration>

Figure 9:
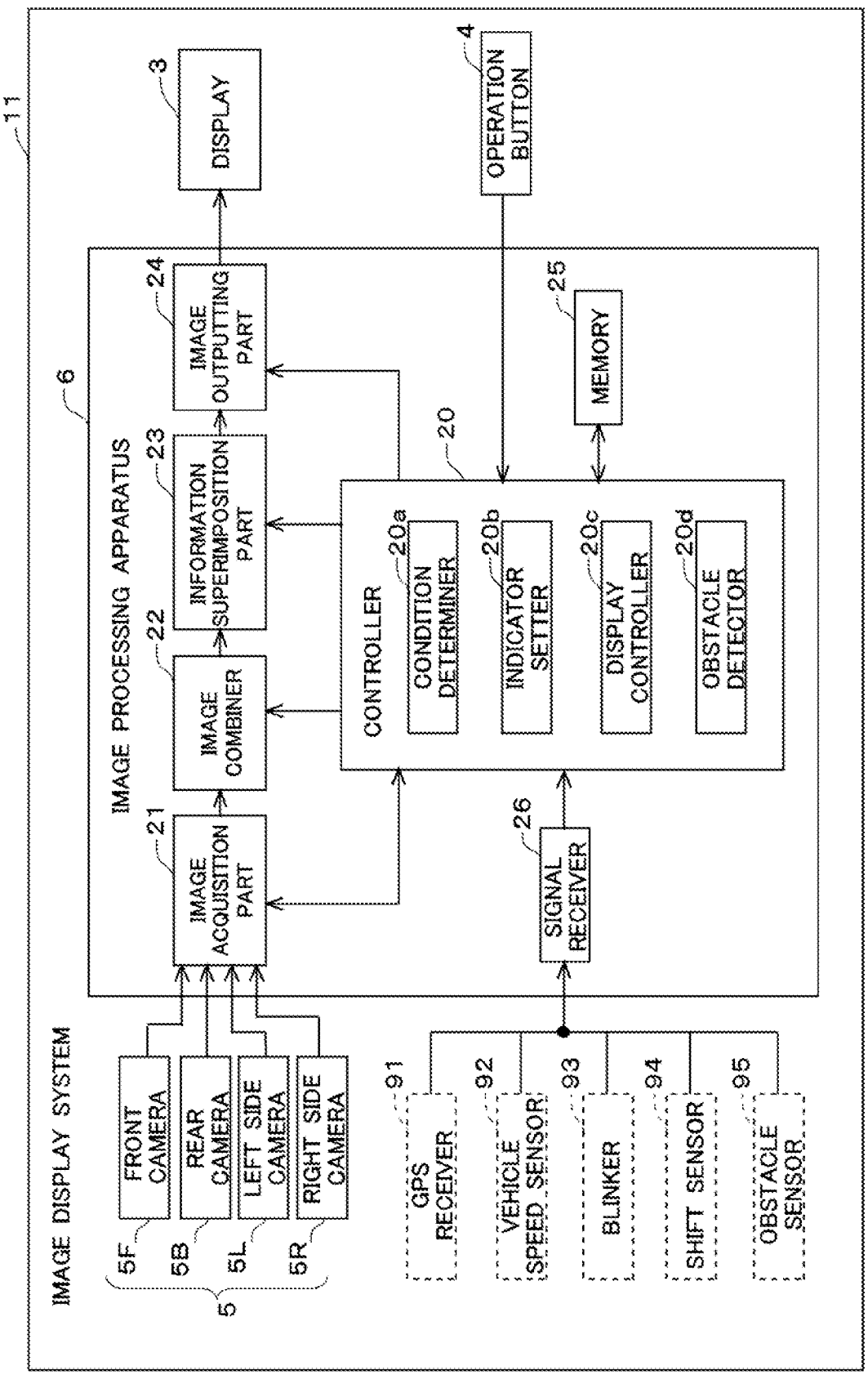
FIG. 9 is an outline of an image display system.

FIG. 9 is a block diagram showing an image display system 11 in the second embodiment. The image display system 11 in the second embodiment is used in a vehicle and includes a function of generating images showing an area of the vicinity of the vehicle and then displaying the generated images in the vehicle, like the image display system 10 in the first embodiment.

Moreover, as shown in FIG. 9, the image display system 11 mainly includes a plurality of cameras 5, an image processing apparatus 6, a display 3 and an operation button 4. The configurations of the plurality of cameras 5, the display 3 and the operation button 4 are substantially the same as the configurations thereof in the first embodiment. Therefore, explanation of the plurality of cameras 5, the display 3 and the operation button 4 is omitted and a configuration of the image processing apparatus 6 is described below.

The image processing apparatus 6 in this embodiment is also an electronic device that performs various image processing. Moreover, the image processing apparatus 6 includes an image acquisition part 21, an image combiner 22, an information superimposition part 23, an image outputting part 24 and a memory 25. Configurations thereof are the same as the configurations of the image acquisition part 21, the image combiner 22, the information superimposition part 23, the image outputting part 24 and the memory 25 in the first embodiment.

Moreover, the image processing apparatus 6 further includes a controller 20 and a signal receiver 26. The controller 20 is a microcomputer including, for example, a CPU, a RAM, a ROM, etc. and comprehensively controls the entire image processing apparatus 6.

The signal receiver 26 receives signals from apparatuses, devices, etc. in the host vehicle 9 that are other than the image processing apparatus 6, and outputs the received signals to the controller 20. In addition to the apparatus and the devices described in the first embodiment, an obstacle sensor 95 is one of the other apparatuses. The obstacle sensor 95 is, for example, an ultrasonic sensor or a radar apparatus. The signal receiver 26 receives, from the obstacle sensor 95, signals, such as ultrasonic waves reflected from the obstacle.

Various functions of the controller 20 are implemented by the CPU performing arithmetic processing based on programs stored in the memory 25. A condition determiner 20a, an indicator setter 20b, a display controller 20c and an obstacle detector 20d are a part of the functions implemented by the CPU performing arithmetic processing based on the programs.

Functions of the condition determiner 20a, the indicator setter 20b and the display controller 20c are the same as the functions thereof in the first embodiment. The obstacle detector 20d detects an obstacle in the vicinity of the host vehicle 9 based on, for example, the captured images acquired by the image acquisition part 21 and the signals that the signal receiver 26 receives from the obstacle sensor 95.

<2-2. System Process>

Figure 10:
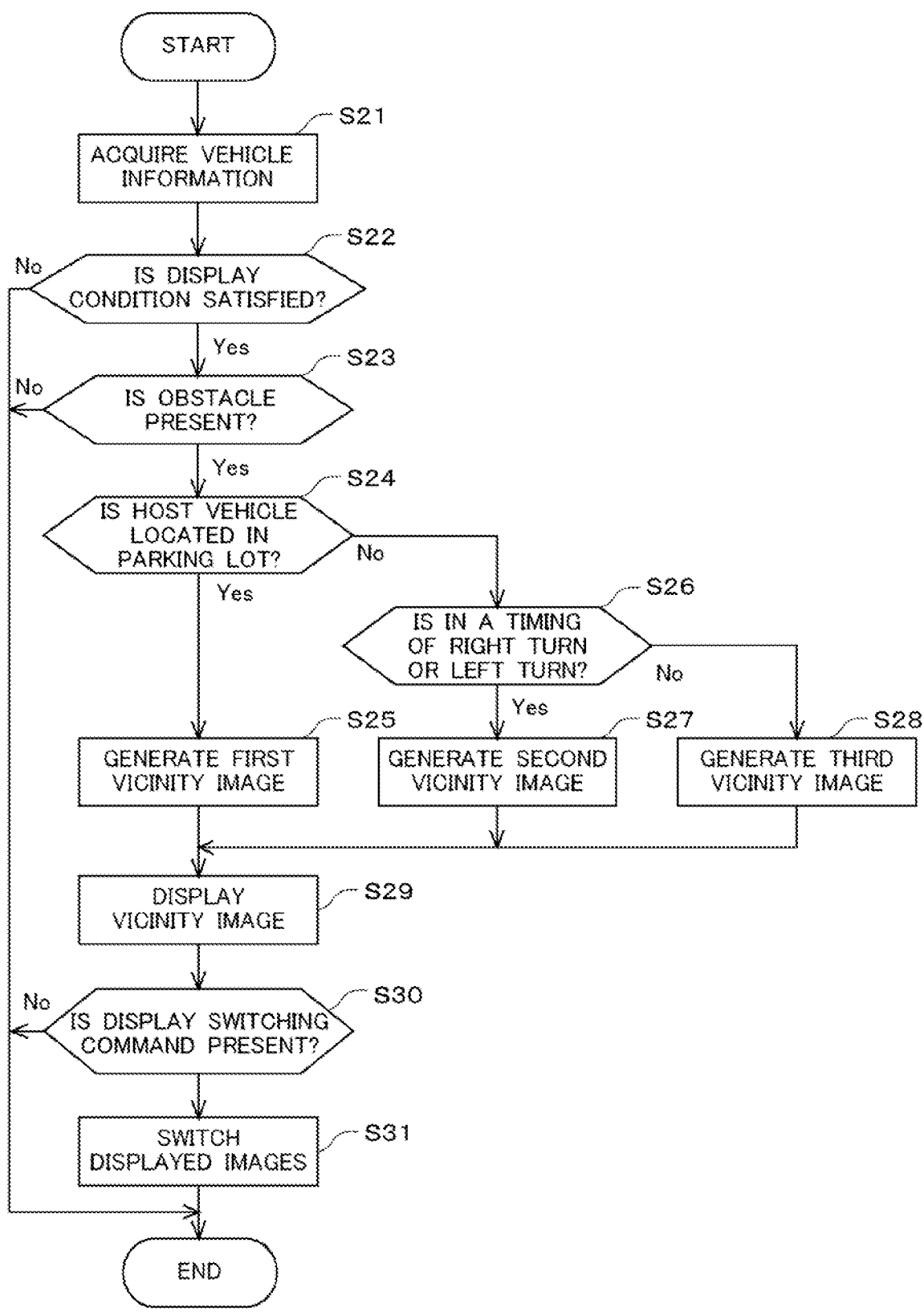
FIG. 10 is a flowchart showing a process performed by an image display system in a second embodiment.

Next, a process performed by the image display system 11 in the second embodiment is explained. FIG. 10 is a flowchart showing a flow of the process performed by the image display system 11.

The process performed by the image display system 11 is started, for example, by start-up of the image display system 11. When the process is started, the image display system 11 acquires vehicle information (a step S21). Then, the image display system 11 determines whether or not a display condition is satisfied (a step S22). Those steps are the same as the steps S11 and S12 in the first embodiment.

Next, the image display system 11 determines presence or absence of an object, such as an obstacle, in the vicinity of the host vehicle 9 (a step S23). For example, the obstacle detector 20d determines presence or absence of the obstacle, using captured images or a result detected by the obstacle sensor 95. Concretely, in order to detect an obstacle, the obstacle detector 20d may use a conventional method, such as detection based on analysis of the captured images and detection based on information acquired from an ultrasonic sensor and a radar apparatus.

In a case of absence of an obstacle in the vicinity of the host vehicle 9 (No in the step S23), the image display system 11 ends the process. On the other hand, in a case of presence of an obstacle in the vicinity of the host vehicle 9 (Yes in the step S23), the image display system 11 performs a process of generating the vicinity image 71 to be displayed (steps S24 to S28). The steps S24 to S28 is the substantially the same as the steps S13 to S17 in the first embodiment.

Then, once the vicinity image 71 is generated, the display 3 displays the vicinity image 71 (a step S29). In other words, the display controller 20c controls the image outputting part 24 to output to the display 3 the vicinity image 71 generated by the information superimposition part 23. Then, the display 3 displays the vicinity image 71 input from the image outputting part 24.

Figure 11:
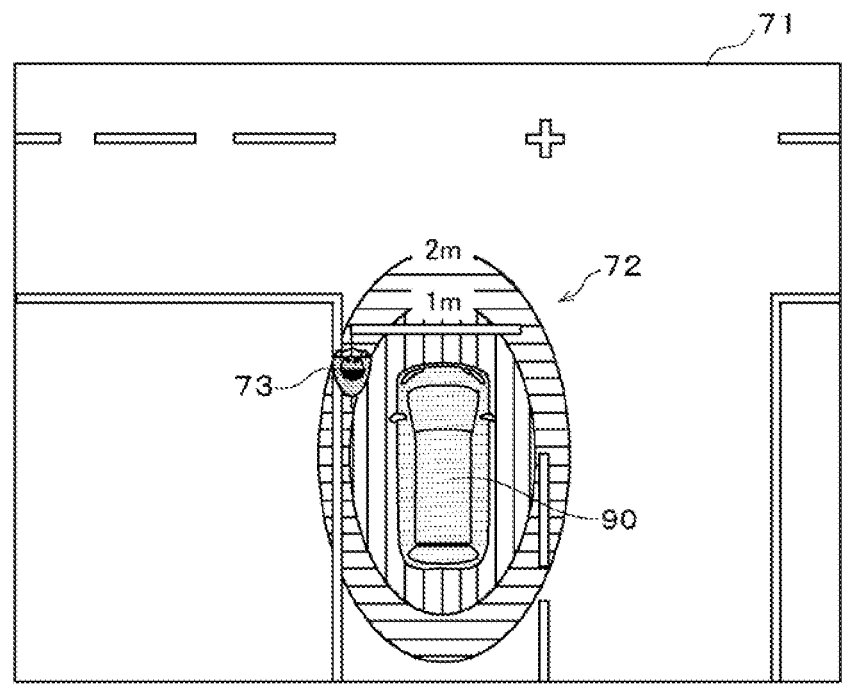
FIG. 11 illustrates an example of a vicinity image.
Figure 12:
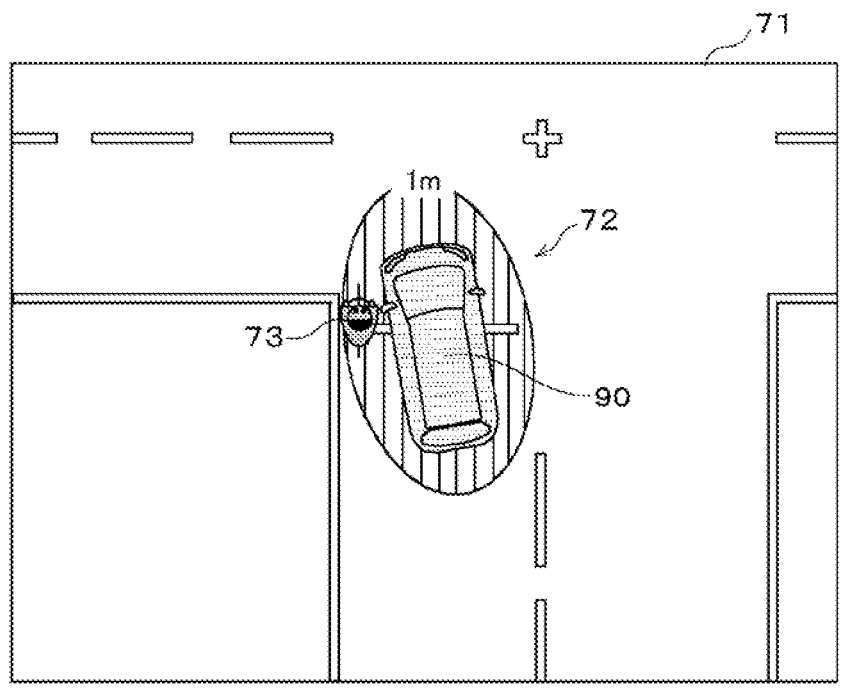
FIG. 12 illustrates an example of a vicinity image.

Here, a display process of the vicinity image 71 in this embodiment is described. Each of FIG. 11 and FIG. 12 illustrates a displayed example of the vicinity image 71.

In this embodiment, the vicinity image 71 is displayed in a case of presence of an obstacle in the vicinity of the host vehicle. Therefore, as shown in FIG. 11, an image 73 of the obstacle is displayed in the vicinity image 71. As shown in FIG. 11, a user can easily understand a distance to the obstacle by display of a distance indicator 72 along with an image 73 of the obstacle.

When the vicinity image 71 is displayed, in addition to display of the distance indicator 72, a distance region in which an obstacle exists may blink on the display 3. In a case of FIG. 11, there are a distance region less than 1 m from the host vehicle 9 (inner region) and a distance region from 1 m to 2 m from the host vehicle 9 (outer region). The outer region in which the obstacle exists may blink while the inner region is displayed normally. Contrarily, in a case where an obstacle exists in the inner region, the inner region may blink and the outer region is displayed normally.

Blinking a distance region is not limited to the case of two distance lines but may be used for a case of three or more distance lines. In other words, the distance regions are not limited to the two regions of the inner region and the outer region but may be three or more. In a case of plural distance regions, a distance region in which an obstacle exists may blink. Thus, the user can understand more intuitively a location in which an obstacle exists.

Moreover, a distance region of the distance indicator 72 outer than the distance region in which the obstacle exists may not be displayed. For example, in a case where an obstacle exists in the inner region, the outer region is not displayed. Concretely, as shown in FIG. 12, in a case where the obstacle exists in the distance region less than 1 m from the host vehicle, the distance region less than 1 m of the distance indicator 72 is displayed and the distance region from 1 m to 2 m that is the outer region is not displayed. For example, in a case where the host vehicle is moving from a state in FIG. 11 to a state in FIG. 12, if the obstacle exists in the outer region, the outer region and the inner region are displayed (FIG. 11), and if the obstacle moves to the inner region, only the inner region is displayed and the outer region is not displayed (FIG. 12).

The distance lines are not limited to two but may be three or more. In other words, the distance regions are not limited to the two regions of the inner region and the outer region but may be three or more. In a case of three distance regions (three distance lines), if an obstacle exists in a second region, the second region where the obstacle exists and a region inner than the second region are displayed but a most outer region is not displayed.

Therefore, in a case where the obstacle approaches gradually the host vehicle 9, display of the distance regions is phased out from the most outer region. Contrarily, in a case where an obstacle approaches and then moves away from the host vehicle 9, the outer regions are phased out once and then are gradually displayed again. As described above, in a case where an obstacle exists in the vicinity of the host vehicle 9, since a distance region in which the obstacle exists is displayed as a most outer region, a distance to the obstacle can be easily understood.

Next, with reference back to FIG. 10, presence or absence of a display switching command is determined (a step S30). In a case of absence of the display switching command (No in the step S30), the process ends without switching the vicinity image 71. On the other hand, in a case of presence of the display switching command (Yes in the step S30), the display 3 switches a displayed image to a newly generated vicinity image 71 (a step S31). These steps S30 and S31 are similar to the steps S19 and S20 in the first embodiment.

It is recommended that the vicinity image 71 should be generated such that the distance indicator 72 overlapping with an obstacle is not displayed. If the obstacle is hidden and unable to be seen under the distance indicator 72 may pose a risk.

3. Third Embodiment

Next, a third embodiment is described. The first and second embodiments describe the configurations to display the vicinity image 71 generated by superimposing the distance indicator 72 encompassing the entire periphery of the host vehicle 9 on the composite image. However, the invention is not limited to the configurations but the invention may be configured to display a vicinity image 71 on which a distance indicator 72 encompassing only a part of the periphery of the host vehicle 9 is superimposed, depending on a traveling state of the host vehicle 9. In the third embodiment, the configuration is described. In the explanation described below, difference from the first and second embodiments is mainly described and there is a case where explanation of similar points is omitted.

<1-3. System Configuration>

An image display system in the third embodiment may be implemented in any of the image display system 10 in the first embodiment and the image display system 11 in the second embodiment. However, a process performed by an information superimposition part 23 in this embodiment is partially different from the processes performed by the information superimposition part 23 in the first embodiment and the second embodiment.

Concretely, the information superimposition part 23 of this embodiment generates the vicinity image 71 by superimposing the distance indicator 72 showing distances from a host vehicle 9 on a composite image, like the first and second embodiments. However, there is a case where the information superimposition part 23 in this embodiment generates the vicinity image 71 by superimposing the distance indicator 72 encompassing only a part of the periphery of the host vehicle 9 on a composite image, depending on a traveling state of the host vehicle 9. In other words, in this embodiment, depending on a traveling state of the host vehicle 9, the information superimposition part 23 generates the vicinity image 71 by superimposing the distance indicator 72 encompassing the entire periphery or a part of the periphery of the host vehicle 9 on a composite image.

Figure 13:
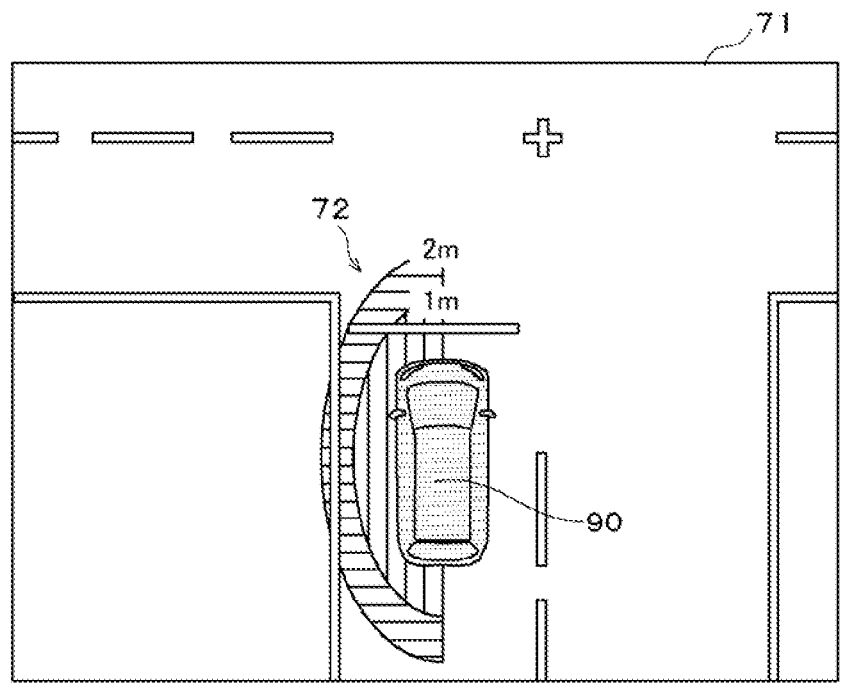
FIG. 13 illustrates an example of a vicinity image.
Figure 14:
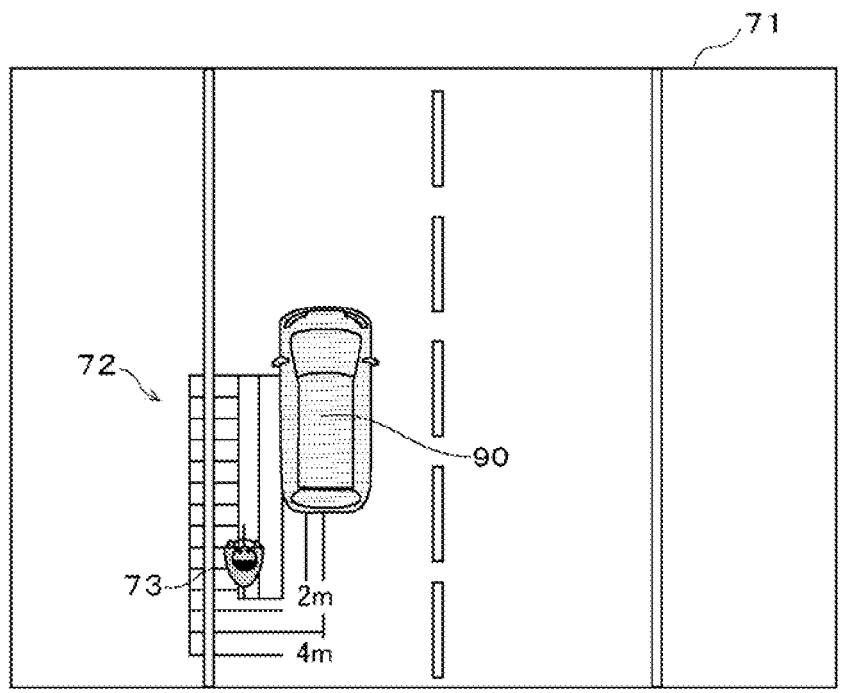
FIG. 14 illustrates an example of a vicinity image.

With reference to FIG. 13 and FIG. 14, examples of the vicinity image 71 are explained. As shown in FIG. 13, for example, when the host vehicle 9 turns left at an intersection, the distance indicator 72 included in the generated vicinity image 71 compasses only a left side of the entire periphery of the host vehicle 9. Moreover, as shown in FIG. 14, for example, in a case where an obstacle exists in the vicinity of the host vehicle 9, the distance indicator 72 included in the generated vicinity image 71 encompasses only a side of the periphery of the host vehicle 9 on which the obstacle exists.

<3-2. System Process>

Next, a process performed by the image display system is described. The process performed in this embodiment may be used in one of the processes explained with reference to the flowcharts in FIG. 7 and FIG. 10. In the steps (the steps S14, S16, S17, S25, S27 and S28) for generating the vicinity image 71, the distance indicator 72 encompassing only a part of the periphery of the host vehicle 9 is used in this embodiment.

Concretely, when generating the vicinity image 71, the information superimposition part 23 determines whether or not to use the distance indicator 72 encompassing only a part of the periphery of the host vehicle 9 based on vehicle information indicating the traveling state of the host vehicle 9, such as information received by a signal receiver 26 and map data in a memory 25.

In a case of use of the distance indicator 72 encompassing only a part of the periphery of the host vehicle 9, the information superimposition part 23 determines, depending on a traveling state of the host vehicle 9, a size of the distance indicator 72 and an encompassed area that is a partial area of the periphery of the host vehicle 9 to be encompassed. Then, the information superimposition part 23, like in the first and second embodiments, processes, based on the determined size and the encompassed area, the distance indicator 72 selected by an indicator setter 20b. Then, the vicinity image 71 is generated by superimposing the processed distance indicator 72 on the composite image.

For example, in the step S16 in FIG. 7 in which a second vicinity image 71b is generated, in a case where the host vehicle 9 turns left, the information superimposition part 23 processes a substantially ellipse-shaped distance indicator 72 selected by the indicator setter 20b into a distance indicator 72 encompassing only a left side of the periphery of the host vehicle 9. Then, the information superimposition part 23 generates the second vicinity image 71b by superimposing the processed distance indicator 72 on a composite image (FIG. 13).

Moreover, in the step S28 in FIG. 10 in which the third vicinity image 71c is generated, in a case where an obstacle exists in the vicinity of the host vehicle 9, the information superimposition part 23 processes a substantially rectangle-shaped distance indicator 72 selected by the indicator setter 20b into a distance indicator 72 encompassing only a part of the periphery of the host vehicle 9 in a direction in which the obstacle exists. Then, the information superimposition part 23 generates the third vicinity image 71c by superimposing the processed the distance indicator 72 on a composite image (FIG. 14). It is possible to intuitively understand a distance in a direction in which an attention especially needs to be paid, by such a configuration.

Such a case where the information superimposition part 23 uses the distance indicator 72 encompassing only a part of the periphery of the host vehicle 9 is not limited to the case where the host vehicle 9 turns right or left or to the case where an obstacle exists in the vicinity of the host vehicle 9 but can be used in other traveling states. Further, in the case where the information superimposition part 23 uses the distance indicator 72 encompassing only a part of the periphery of the host vehicle 9, a size and an encompassed area of the distance indicator 72 may be arbitrarily set.

In this embodiment, depending on the traveling state, a size and an encompassed area of the distance indicator 72 are determined by the information superimposition part 23 but are not limited to the determination made by the information superimposition part 23. For example, the memory 25 stores beforehand image data of the distance indicator 72 processed in predetermined shapes and the indicator setter 20b may select one of the processed shapes of the distance indicator 72 stored in the memory 25. In this case, the information superimposition part 23 only superimposes the selected distance indicator 72 on a composite image, as described in the foregoing embodiment, without processing of the distance indicator 72.

A method of selecting and superimposing the distance indicator 72 is described with a concrete example. For example, the memory 25 stores the image data of the substantially ellipse-shaped distance indicator 72 encompassing only the left side of the periphery of the host vehicle 9. In this case, when the host vehicle 9 turns left, the indicator setter 20b selects the distance indicator 72 encompassing only the left side of the periphery of the host vehicle 9. Then, the information superimposition part 23 superimposes the selected distance indicator 72 on a composite image. In this case, since the information superimposition part 23 does not have to determine a size and an encompassed area of the distance indicator 72 that is superimposed, a process load of the information superimposition part 23 can be reduced.

4. Modifications

The embodiments of the invention are described above. However, the invention is not limited to the foregoing embodiments but other various modifications are possible. Such modifications are described below. Any of all forms in the foregoing embodiments and modifications below may be combined arbitrarily with one another.

Figure 15:
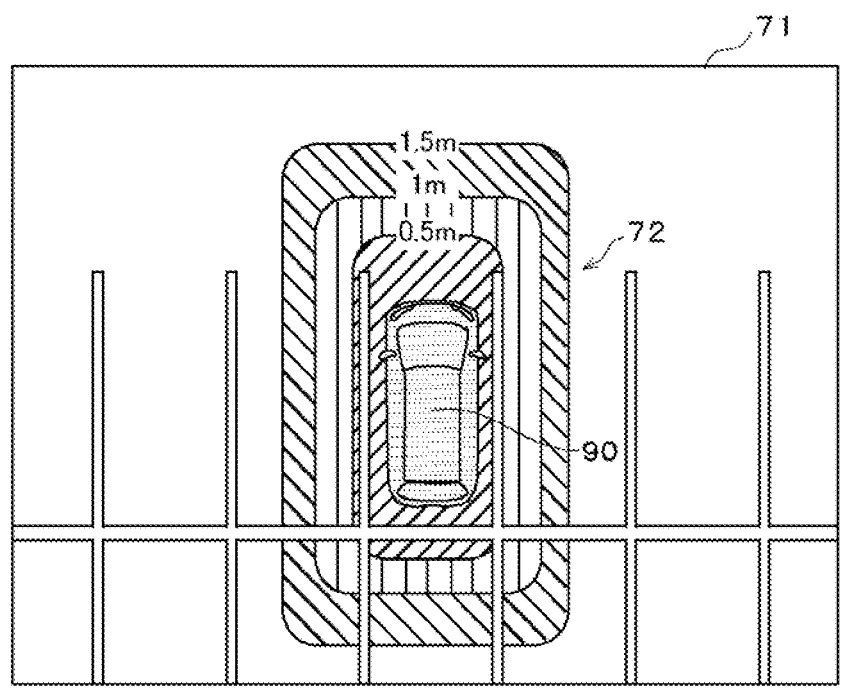
FIG. 15 illustrates an example of a vicinity image.

In the foregoing embodiments, the substantially rectangle-shaped distance indicator 72 is used for the first vicinity image 71a and the third vicinity image 71c. However, the distance indicator 72 is not limited to the substantially rectangle-shape. For example, as shown in FIG. 15, a shape of the distance indicator 72 may be a rectangle having rounded corners. Moreover, in the vicinity image 71 in the first to third embodiments, the plural distance areas defined and formed by the plurality of distance lines of the distance indicator may be shown in arbitrary different colors or patterns. In this case, it is recommended that colors for the plural distance areas should be different from one another.

Figure 16:
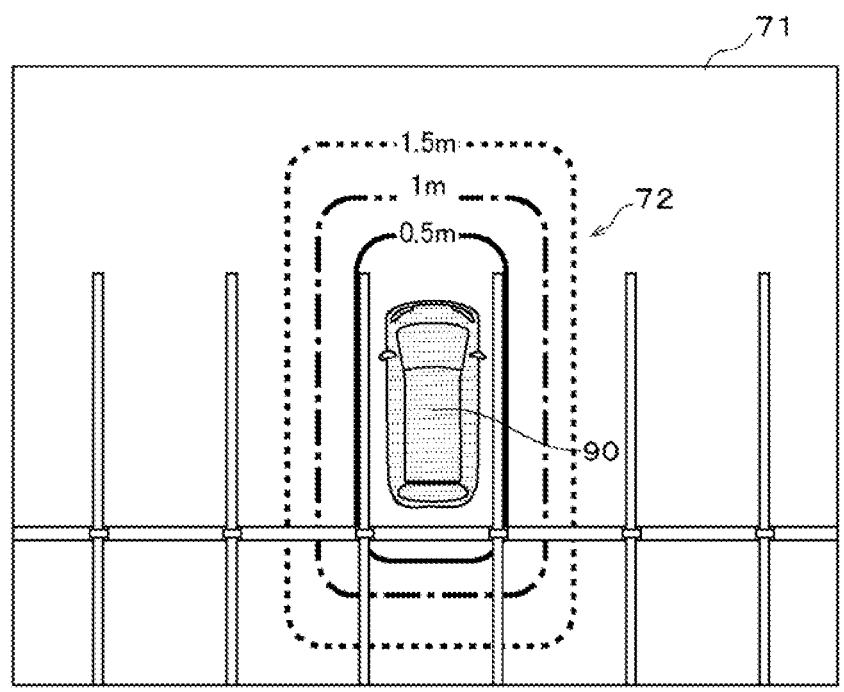
FIG. 16 illustrates an example of a vicinity image.

Moreover, as shown in FIG. 16, the distance indicator 72 that is used for the vicinity image 71 may be shown only by the distance lines. In other words, the plural distance areas defined by the plurality of distance lines of the distance indicator may be shown by frame borders (distance lines) without arbitrary different colors or patterns. In this case, types of the frame borders may be different from one distance line to another. As explained above, a shape and the like of the distance indicator 72 may be changed optionally by a user.

In the foregoing embodiments, the intervals between the two or three distance lines included in the distance indicator 72 are 0.5 m. However, the intervals are not limited to 0.5 m. Intervals or number of the distance lines included in the distance indicator 72 may be arbitrarily determined.

Moreover, in a case where the vicinity image 71 is enlarged to display, intervals between distance lines included in the distance indicator 72 may be changed, depending on magnification power. For example, in a case where the vicinity image 71 showing the distance lines at 2 m-intervals is enlarged and displayed, the 2 m-intervals between the distance lines are changed to, for example, 1 m-intervals. In accordance with enlargement of the vicinity image 71, a value of the intervals between the distance lines in the distance indicator 72 may become smaller.

Moreover, in the foregoing embodiments, in the case where the host vehicle 9 is not in the timing of a right turn or a left turn (in the case of No in the step S15 or the step S25), the process for generating the third vicinity image 71c is performed. However, a timing of the generation of the third vicinity image 71c is not limited to the case of No in the step S15 or the step S25. Further, it is determined whether or not a host vehicle is traveling and then a different vicinity image 71 may be generated, depending on a result of the determination. Concretely, in the case where the host vehicle 9 is not in the timing of a right turn or a left turn, it is determined whether the host vehicle is traveling or stopped. Then, for example, in a case where the host vehicle is traveling, the third vicinity image 71c is generated, and in a case where the host vehicle is stopped, the image display system generates a fourth vicinity image 71d showing intervals between the distance lines are wider than the intervals in the third vicinity image 71c.

In the foregoing embodiments, the various functions are implemented by software by the CPU performing the arithmetic process in accordance with the program. However, a part of those functions may be implemented by an electric hardware circuit. Moreover, in the foregoing embodiments, a part of functions that are implemented by a hardware circuit may be implemented by software.

While the invention has been shown and described in detail, the foregoing description is in all aspects illustrative and not restrictive. It is therefore understood that numerous other modifications and variations can be devised without departing from the scope of the invention.

What is claimed is:

1. An image processing apparatus that processes an image, the image processing apparatus comprising:

an image processor configured to:

acquire a plurality of captured images captured by a plurality of cameras installed on a vehicle;

generate a composite image showing a vicinity of the vehicle on all sides of the vehicle viewed from a virtual viewpoint, using the plurality of captured images;

acquire information relating to a traveling state of the vehicle;

generate a vicinity image by superimposing a distance indicator on the composite image, the distance indicator encompassing a periphery of the vehicle in the composite image; and output the vicinity image to a display to cause the vicinity image to be displayed on the display, wherein in a first mode, the vicinity image is displayed as the composite image generated using the plurality of captured images showing the vicinity of the vehicle on all sides of the vehicle from the virtual viewpoint and superimposed with the distance indicator that encompasses an entire periphery of the vehicle, and in a second mode, the vicinity image is displayed as the composite image generated using the plurality of captured images showing the vicinity of the vehicle on all sides of the vehicle from the virtual viewpoint and superimposed with the distance indicator that encompasses only a part of the periphery of the vehicle, the first mode or the second mode being selected depending on the traveling state of the vehicle, the distance indicator displayed in the first mode being different from the distance indicator displayed in the second mode, and the distance indicator includes a plurality of distance lines showing different distances from the vehicle and intervals between the plurality of distance lines are varied by the image processor depending on the traveling state of the vehicle.

2. The image processing apparatus according to claim 1, wherein in a case where the traveling state of the vehicle satisfies a predetermined condition, the image processor generates the vicinity image.

3. The image processing apparatus according to claim 1, wherein the distance indicator includes plural areas defined by a plurality of distance lines showing different distances from the vehicle and colors of the plural areas are different from one another.

4. The image processing apparatus according to claim 1, further comprising:

a detector that detects an object in the vicinity of the vehicle, wherein in a case of presence of the object in the vicinity of the vehicle, the image processor generates the vicinity image.

5. The image processing apparatus according to claim 1, wherein:

the image processor is configured to select the distance indicator, based on a determined location of the vehicle, from a plurality of available distance indicators that are different from each other.

6. The image processing apparatus according to claim 1, wherein the image processor acquires information relating to a location of the vehicle and the intervals between the plurality of distance lines are also varied by the image processor depending on the location of the vehicle.

7. An image display system comprising:

an image processor configured to:

(i) acquire a plurality of captured images captured by a plurality of cameras installed on a vehicle;

(ii) generate a composite image showing a vicinity of the vehicle on all sides of the vehicle viewed from a virtual viewpoint, using the plurality of captured images;

(iii) acquire information relating to a traveling state of the vehicle; and (iv) generate a vicinity image by superimposing a distance indicator on the composite image, the distance indicator encompassing a periphery of the vehicle in the composite image; and a display that displays the vicinity image generated by the image processor, wherein in a first mode, the vicinity image is displayed as the composite image generated using the plurality of captured images showing the vicinity of the vehicle on all sides of the vehicle from the virtual viewpoint and superimposed with the distance indicator that encompasses an entire periphery of the vehicle, and in a second mode, the vicinity image is displayed as the composite image generated using the plurality of captured images showing the vicinity of the vehicle on all sides of the vehicle from the virtual viewpoint and superimposed with the distance indicator that encompasses only a part of the periphery of the vehicle, the first mode or the second mode being selected depending on the traveling state of the vehicle, the distance indicator displayed in the first mode being different from the distance indicator displayed in the second mode, and the distance indicator includes a plurality of distance lines showing different distances from the vehicle and intervals between the plurality of distance lines are varied by the image processor depending on the traveling state of the vehicle.

8. The image display system according to claim 7, wherein the image processor acquires information relating to a location of the vehicle and the intervals between the plurality of distance lines are also varied by the image processor depending on the location of the vehicle.

9. An image processing method that processes an image, the image processing method comprising the steps of:

(a) acquiring, by an image processor, a plurality of captured images captured by a plurality of cameras installed on a vehicle;

(b) generating, by the image processor, a composite image showing a vicinity of the vehicle on all sides of the vehicle viewed from a virtual viewpoint, using the plurality of captured images;

(c) acquiring, by the image processor, information relating to a traveling state of the vehicle;

(d) generating, by the image processor, a vicinity image by superimposing a distance indicator on the composite image, the distance indicator encompassing a periphery of the vehicle in the composite image; and (e) outputting, by the image processor, the vicinity image to a display to cause the vicinity image to be displayed on the display, wherein in a first mode, the vicinity image is displayed as the composite image generated using the plurality of captured images showing the vicinity of the vehicle on all sides of the vehicle from the virtual viewpoint and superimposed with the distance indicator that encompasses an entire periphery of the vehicle, and in a second mode, the vicinity image is displayed as the composite image generated using the plurality of captured images showing the vicinity of the vehicle on all sides of the vehicle from the virtual viewpoint and superimposed with the distance indicator that encompasses only a part of the periphery of the vehicle, the first mode or the second mode being selected depending on the traveling state of the vehicle, the distance indicator displayed in the first mode being different from the distance indicator displayed in the second mode, and the distance indicator includes a plurality of distance lines showing different distances from the vehicle and intervals between the plurality of distance lines are varied depending on the traveling state of the vehicle.

10. The image processing method according to claim 9, wherein in a case where the traveling state of the vehicle satisfies a predetermined condition, the step (c) generates the vicinity image.

11. The image processing method according to claim 9, wherein the distance indicator includes plural areas defined by a plurality of distance lines showing different distances from the vehicle and colors of the plural areas are different from one another.

12. The image processing method according to claim 9, further comprising the step of:

(f) detecting an object in the vicinity of the vehicle, wherein in a case of presence of the object in the vicinity of the vehicle, the step (d) generates the vicinity image.

13. The image processing method according to claim 9, wherein the image processor acquires information relating to a location of the vehicle and the intervals between the plurality of distance lines are also varied by the image processor depending on the location of the vehicle.

* * * * *